E. Lord.
Bending Bars, &c.
Nº 53,242.
Patented Mar. 13, 1866.
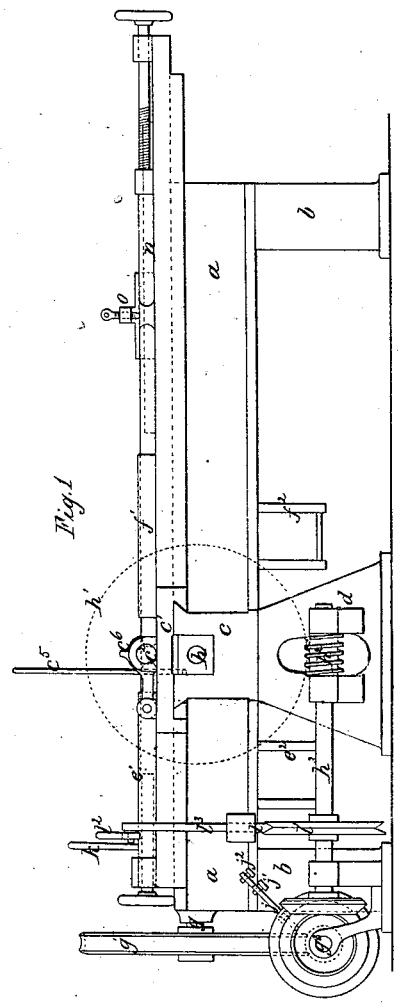
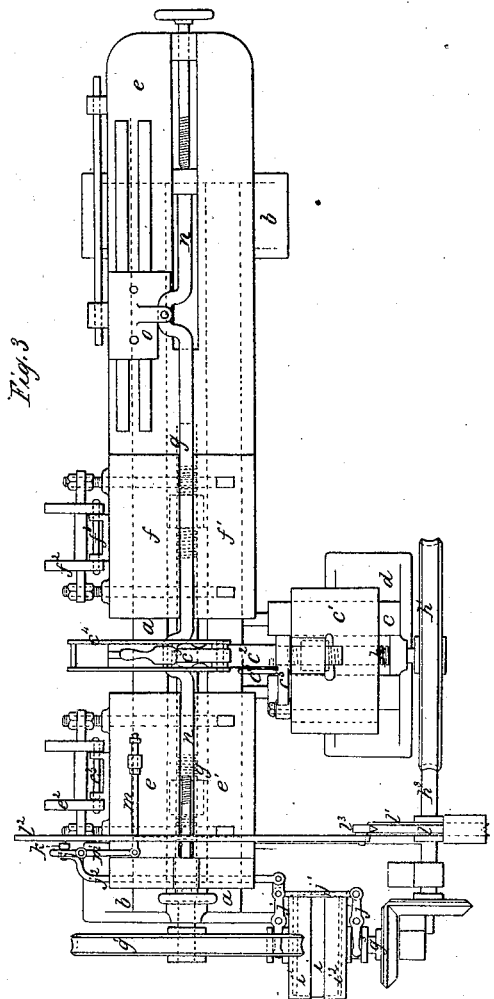
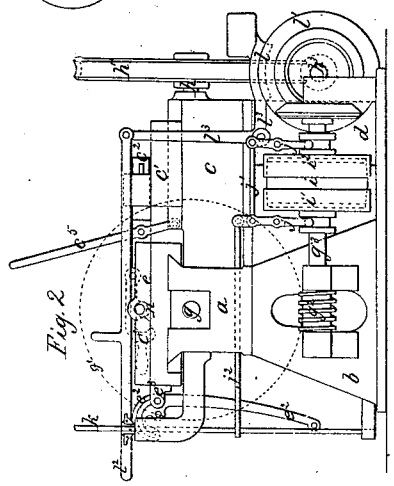
Witnesses
H. B. Barlow
John Perkins
Inventor
Edw. Lord

UNITED STATES PATENT OFFICE.

EDWARD LORD, OF TODMORDEN, GREAT BRITAIN.

IMPROVED MACHINE FOR BENDING CRANKS ON RODS.

Specification forming part of Letters Patent No. 53,242, dated March 13, 1866.

*To all whom it may concern:*

Be it known that I, EDWARD LORD, of Todmorden, in the county of York, England, machine-maker, have invented certain new and useful Improvements in Machinery for Forging or Bending Cranks on Bars of Metal; and I hereby declare the following to be a full, clear, and exact description thereof, reference being had to the annexed sheet of drawings, forming part of this specification.

Figure 1 is a front elevation, Fig. 2 is an end elevation, and Fig. 3 a plan, of a machine for bending straight rods or bars of iron into crank-shafts.

The bed-plate $a$ is supported on standards $b$ in any convenient manner. At right angles to the bed-plate $a$ is fixed the bed-plate $c$, supported by the standard $d$. The slides $e$ and $f$ are fitted on the bed $a$, each slide having a screw-nut attached to it taking into the screw $g$, one part of which has a right-hand thread and the other part has a left-hand thread, so that when the screw revolves the slides approach or recede from each other. The slide $c'$ fits on the bed $c$, and has a nut taking into the screw $h$. The slides $e$ and $f$ have blocks $e'$ and $f'$ connected to them to hold the bar of iron which has to be bent. These blocks are moved to and fro to tighten up or liberate the bar on which the crank is to be formed by the eccentric slots in the levers $e^2$ and $f^2$, acting on the bars $e^3$ and $f^3$.

To the slide $c'$ is fixed a projection in which the strong stud $c^2$ is capable of sliding. This stud is furnished with a grasping-block, $c^3$, passing around the bar of iron to be bent, and with a bridle, $c^4$.

The screws $g$ and $h$ are connected by the gearing shown in the drawings, so as to rotate simultaneously, each screw having a worm-wheel, marked, respectively, $g'$ and $h'$, fixed to one end. These worm-wheels are driven by the worms $g^2$ and $h^2$, fixed on the shafts $g^3$ and $h^3$, which are connected by miter-gearing.

To the shaft $g^3$ is fixed the double-friction cone $i$, and on the same shaft are two loose pulleys, $i'$ and $i^2$, one of which is driven by an open strap and the other by a crossed strap. These pulleys are moved simultaneously into and out of contact with the friction-cone $i$ by the levers $j$, which are connected together by the link $j'$ and to the spring starting-lever $k$ by the link $j^2$. The upper end of the starting-lever is connected to the break $l$ on the grooved pulley $l'$ by the bar $l^2$ and elbow-lever $l^3$. The object of this arrangement is to apply the break immediately when the machine requires to be stopped. The upper end of the spring starting-lever $k$ is held between two relieving-notches, from which it can be liberated, when required, by the attendant moving the rod $m$, connected to the lever $m'$. (Shown in Fig. 3.)

The mode of operation is follows: The drawings represent the parts in the positions they should occupy when the bar marked $n$ is put into the machine in its straight state. The bar $n$, having been heated in the required place, is laid on the slides $e$ and $f$, to which it is firmly secured by the clamps $e'$ and $f'$, or otherwise. The driving-pulley is then moved onto the driving-cone, which gives the requisite motion to the screw $g$ for bringing the slides $e$ and $f$ toward each other, and for moving the slide $c'$ toward the bar $n$. These combined motions of the slides gradually bend the bar to the shape of the crank required, as indicated in Fig. 3, the grasping-block $c^3$ holding the crank straight while the slides $e$ and $f$ are approaching each other. As soon as the crank is formed the bar $n$ is liberated from the slides $e$ and $f$ by elevating the grasping-block $c^3$, and the pulleys $i$ and $i^2$ are moved so as to reverse the direction of motion of the screws $g$ and $h$, which are thus brought back to their original positions, and other cranks are bent in like manner.

When it is requisite, as in looms, to make two cranks on the same shaft I make use of the adjustable block $o$, which has a recess to hold the crank that has been previously bent while the second crank is being formed.

It is evident that, by securing the block $o$ to the slide $e$ at the requisite distance from the center of the slide $c'$, the second cranks will all be kept to the same uniform distance from the crank previously made.

When the crank has been bent the bridle $c^4$ is thrown back to raise the grasping-block $c^3$, thereby liberating the crank. The slides $e$ and $f$ are then brought back to their original positions and another heated straight bar is laid in the machine and secured, as above described, previous to starting the machine to bend the crank.

My invention may be modified by the use of two dies with certain immovable parts, which dies may be adapted to a steam-hammer or other machinery capable of effecting sufficient pressure.

Having thus described and ascertained the nature of my said invention and the manner in which the same is to be performed, I declare that what I claim as my invention, and desire to secure by Letters Patent of the United States, is—

The combination and arrangement of machinery described and shown in Sheet 1, or any equivalent therefor or modification thereof, for bending straight bars of iron into cranks by the simultaneous action of blocks and dies actuated by screws or otherwise.

In testimony whereof I have hereunto set my hand, before two subscribing witnesses, this 12th day of September, in the year of our Lord 1865.

EDW. LORD.

Witnesses:
   W. B. BARLOW,
      *Patent agent, Manchester.*
   JOHN PERKINS,
      *Draftsman, Manchester.*